United States Patent [19]

McDonnell

[11] Patent Number: 5,343,787
[45] Date of Patent: Sep. 6, 1994

[54] DIE HOLDER ASSEMBLY

[76] Inventor: George P. McDonnell, 5 Rowe Ct., Bethany, Conn. 06524-3606

[21] Appl. No.: 36,060

[22] Filed: Mar. 23, 1993

[51] Int. Cl.⁵ .............................................. B23G 5/00
[52] U.S. Cl. ................................. 82/110; 408/221; 408/239 R; 470/67; 470/207
[58] Field of Search .................. 82/110; 408/120, 121, 408/123, 221, 215, 216, 239 R; 470/67, 183, 185, 207

[56] References Cited

U.S. PATENT DOCUMENTS

| Re. 23,210 | 3/1950 | Johnson | 408/221 |
|---|---|---|---|
| 1,154,010 | 9/1915 | Grunbauch | 470/66 |
| 2,159,680 | 5/1939 | West | 470/207 |
| 2,383,991 | 9/1945 | Sarossy | 82/110 |
| 2,465,541 | 3/1949 | Kreshock | 408/215 |
| 2,718,646 | 9/1955 | McKenzie | 408/174 |
| 4,095,917 | 6/1978 | Wesner | 408/221 |
| 4,097,182 | 6/1978 | Rolnick | 470/207 |
| 5,003,852 | 4/1991 | Kelly | 82/110 |

Primary Examiner—Daniel W. Howell
Attorney, Agent, or Firm—Chilton, Alix & Van Kirk

[57] ABSTRACT

A die holder assembly mounts to a conventional lathe for holding a die to facilitate cutting of a thread into a workpiece. The die holder rotatably rides along an alignment shaft which mounts to the chuck of the lathe. The die holder may be manually turned by applying torque via a lever or a wrench while the alignment of the received die is constantly maintained in relation to the workpiece.

18 Claims, 2 Drawing Sheets

DIE HOLDER ASSEMBLY

BACKGROUND OF THE INVENTION

This invention relates generally to devices which are employed for holding dies for cutting external threads. More particularly, the present invention relates generally to tooling devices which are employed in conjunction with a lathe to cut a thread into a workpiece.

The formation of a thread onto a workpiece has been conventionally accomplished in a number of ways. For conventional cutting techniques which employ at least some manual input, a die is forced into a threadable engagement with the end of the workpiece. The workpiece is normally clamped in a fixed position. A torque is directly or indirectly applied to the die until the threading has been completed. One of the recurring problems in cutting a thread with the conventional die is ensuring a precise alignment of the thread relative to the central axis of the workpiece. An additional problem is to ensure that a substantially uniform torque is applied to the die throughout the cutting process.

Devices for holding thread dies to which the invention generally relates are disclosed in U.S. Pat. No. 1,154,010 and U.S. Pat. No. 2,718,646.

SUMMARY OF THE INVENTION

Briefly stated, the invention in a preferred form is a die holder assembly adapted for use with a lathe for manually cutting the thread of a workpiece. The die holder assembly comprises a main sleeve-like body having a head and opposite first and second end portions. The head defines a receiving cavity at the first end portion. The cavity is dimensioned to receive a die. A bore extends from the second end portion to a coaxial counterbore which opens into the cavity. The die is fixedly secured in the cavity by a pair of set screws which are disposed at diametrically opposite positions. A hex head applicator surface or other torque receiving surface is disposed at the second end portion. A pair of aligned diametrical openings through the main body are dimensioned so that a rod may be inserted through the main body to facilitate the manual cutting of the thread. The holder is journaled to a shaft which is preferably clamped in the tailstock chuck of the lathe. The workpiece is fixedly clamped in the headstock chuck. The die is rotatably engaged with the workpiece as either the rod is manually pivoted and the holder longitudinally slides along the shaft, or a box wrench or other tool engages the applicator surface and is torqued.

An object of the invention is to provide a new and improved die holder employable for cutting threads into a workpiece.

Another object of the invention is to provide a new and improved die holder which maintains a precise alignment of the die with the workpiece during the thread forming process.

A further object of the invention is to provide a new and improved die holder which readily mounts a die and facilitates the application of a substantially uniform torque throughout the cutting process.

A yet further object of the invention is to provide a new and improved die holder which has an efficient, compact and low cost construction and can be employed in an efficient manner in conjunction with a conventional lathe to provide a highly precise alignment of the die and the workpiece throughout the cutting process.

Other objects and advantages of the invention will become apparent from the specification and the drawings.

DETAILED DESCRIPTION OF THE PREFERRED EMBODIMENT

Figure 1:
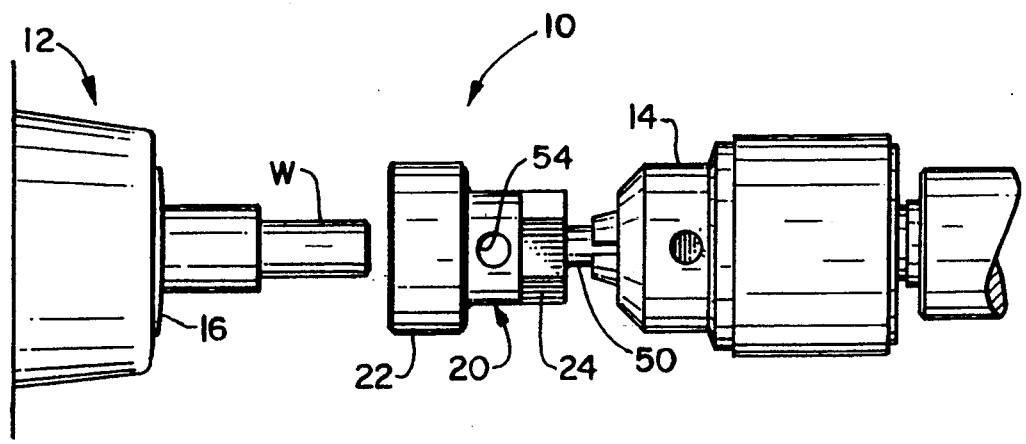
FIG. 1 is a side view of a die holder assembly in accordance with the present invention, portions being omitted, together with a fragmentary portion of a lathe to which the die holder assembly is mounted and a workpiece for which the invention has applicability, said die holder assembly being illustrated in a pre-cutting mode.
Figure 2:
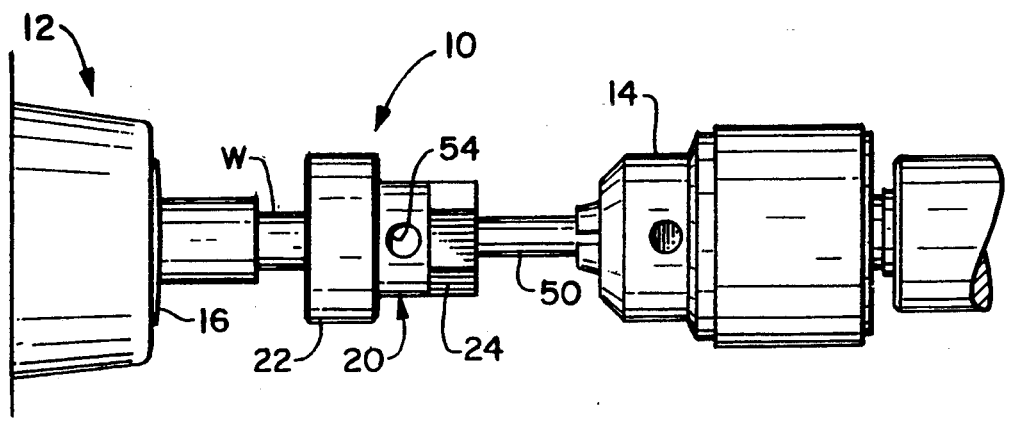
FIG. 2 is a side view of the die holder assembly, lathe portion and workpiece of FIG. 1, said die holder assembly being illustrated in a first cutting mode.
Figure 3:
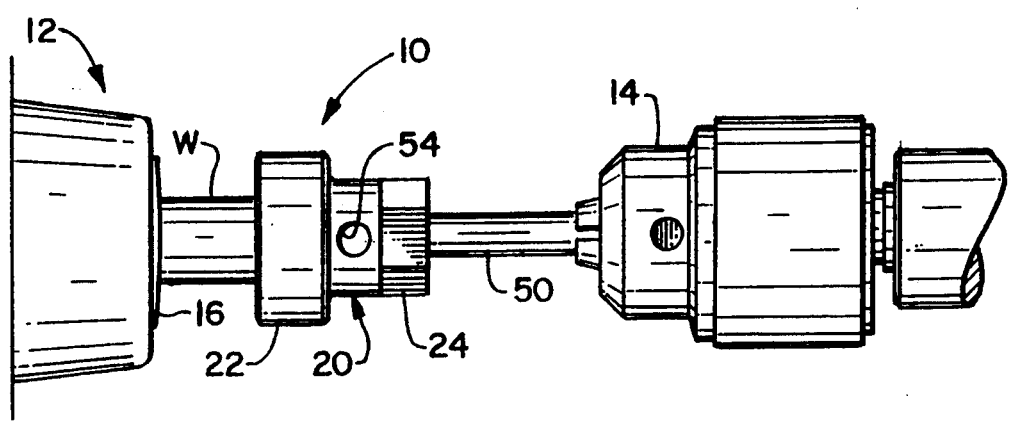
FIG. 3 is a side view of the die holder assembly, lathe portion and workpiece of FIG. 1, said die holder assembly being illustrated in a second cutting mode.

With reference to the drawings wherein like numerals represent like parts throughout the figures, a die holder assembly in accordance with the present invention is generally designated by the numeral 10. With reference to FIGS. 1–3, the die holder assembly 10 is especially adapted for use in conjunction with a lathe designated generally by the numeral 12 for cutting or forming the thread of a workpiece W. The die holder assembly 10 preferably is mounted to the tailstock chuck 14 of the lathe, and, the workpiece W is fixedly mounted to the headstock chuck 16 of the lathe. A conventional button die 18 (FIGS. 4 and 6) for cutting a thread is mounted to the holder. The holder assembly is manually torqued for cutting the thread into the workpiece W.

Figure 4:
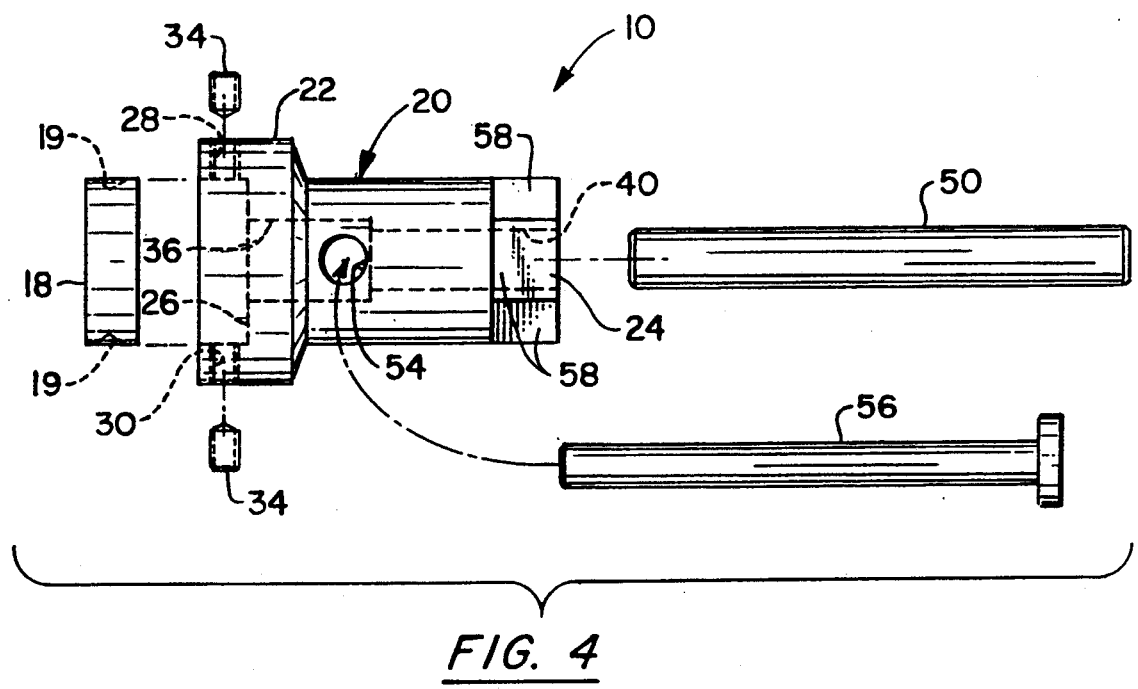
FIG. 4 is an exploded view, partly in phantom, of the die holder assembly of FIG. 1.
Figures 5, 6:
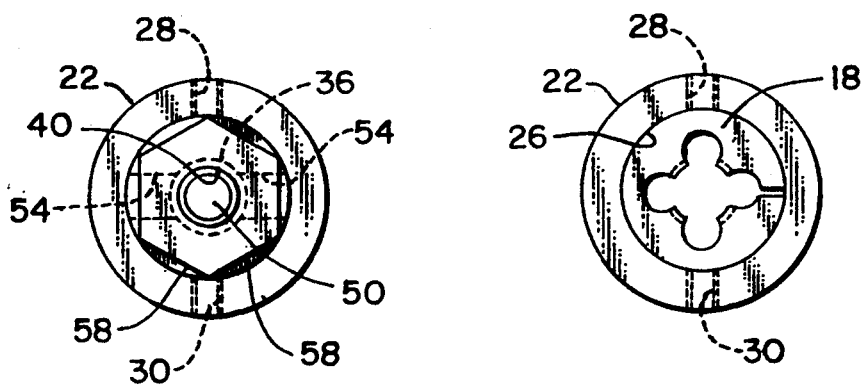
FIG. 5 is a rear view, partly in phantom, of the holder body portion of the die holder assembly of FIG. 1, viewed from the right thereof.
FIG. 6 is a frontal end view, partly in phantom of the die holder assembly of FIG. 1, viewed from the left thereof and further illustrating a die mounted to the holder.

With additional reference to FIG. 4, the die holder assembly 10 comprises a sleeve-like main body 20 which has a socket head 22 at a front end and a hex head 24 at the opposing rear end. The socket head is a generally cylindrical structure which defines a cavity 26. The cavity 26 is dimensioned for closely receiving a conventional button die such as, for example, thread forming die 18 which may typically have an outside diameter of 1 inch. The die also typically has diametrically opposite drill point cavities 19. The cavity 26 is generally symmetrical about a central axis through the holder body. A pair of diametrically opposed diametrical openings 28 and 30 extend through the side walls of the head 22 into the cavity. A pair of cup-point socket set screws 34 are threaded into the openings for engagement in the drill point cavities 19 of the die to thereby secure the die in fixed position within the socket head 22.

A clearance bore 36 coaxial with the cavity 26 extends axially rearwardly from the cavity. The clearance bore 36 is dimensioned to accommodate the threaded end portion of the workpiece W during the thread forming.

The rear portion of the main body is traversed by an axial bore 40 which is coaxial with bore 36 and cavity 26. The bore 40 is dimensioned to closely receive a hardened, ground steel shaft or dowel 50 in a slip-fit relationship. The shaft 50 typically has a diameter of 5/16 ins. The shaft 50 functions as a fixed alignment structure visa vis the centerline of the lathe and the workpiece, as well as the principal mounting structure of the die holder assembly. The shaft 50 is mounted to the tailpiece chuck 14 and clamped into position. The holder body 20 is then longitudinally slidably mounted onto the shaft. The clearance between the bore 40 and the shaft 50 is typically on the order of 0.001 inches.

A pair of aligned radial openings 54 are formed in the body for slidably receiving a lever rod 56 (not illustrated in FIGS. 1 -3) to facilitate rotatable manual torquing of the die holder. Alternately, the flats 58 of the integral hex head 24 may be employed for engagement by a box wrench or open-ended wrench to apply the torque to the die holder.

The die holder assembly 10 is readily mounted to the lathe 12 by first clamping the alignment shaft 50 in the stationary tailstock chuck 14. A light film of oil may be applied to the shaft. A die is selected and then inserted into the socket head 22 and secured by the set screws 34 which align with the drill point cavities 19 of the die. The die holder body 20 is slipped onto the alignment shaft 50. The workpiece W is then clamped in the stationary headstock chuck 16 of the lathe. The pre-cutting position is illustrated in FIG. 1. The lever rod 56 is inserted into the openings 54 of the holder body. The lever rod 56 may extend through the body so that opposing ends are exposed to allow for a two hand application of torque. Alternately, the torque may be applied through an open end or a box wrench (not shown) which engages the hex head flats 58.

With reference to FIG. 2, the die 18 is turned into engagement onto the workpiece W as the holder body 20 is continuously torqued and an axial force is applied. The holder body 20 travels angularly and longitudinally in helical fashion along the alignment shaft 50 (from, for example, the FIG. 2 position to the FIG. 3 position) to maintain a precise alignment with the workpiece W through out the THREADING process. Upon completion of the desired thread (at the FIG. 3 position), the die holder assembly is counter-rotated until the die 18 disengages from the workpiece W, and the die holder assembly 10 essentially returns to the FIG. 1 position.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A die holder assembly for a lathe comprising:
holder body means having opposite first and second end portions and a central axis, said body means comprising cavity means at said first end portion for defining a cavity dimensioned to receive a die insert, said body means comprising bore means for defining a cylindrical mounting bore traversing through said second end portion, and comprising opening means for defining a pair of aligned radial openings, said bore and cavity being coaxial with said axis, said body means exteriorly defining a plurality of flat surfaces equiangularly oriented about said central axis;
securement means mounted to said holder means for fixedly securing a die insert received in said cavity to said holder means;
shaft means slidably received by said bore, said body means being angularly and slidably displaceable thereon; and
a rod slidably removably received in said openings and extending through said body means and said central axis to radially protrude to form a lever arm for rotating said body means about said shaft.

2. The die holder assembly of claim 1 wherein said flat surfaces form a hex head at said second end portion.

3. The die holder assembly of claim 1 wherein said securement means comprises a set screw threaded to said body means.

4. The die holder assembly of claim 3 wherein said securement means comprises a pair of set screws threaded to said body means at diametrically opposed locations thereof.

5. The die holder assembly of claim 1 further comprising clearance bore means for defining a clearance bore coaxial with said axis, said clearance bore extending between said cavity and said mounting bore and having a diameter less than said cavity diameter and greater than said mounting bore diameter.

6. A die holder assembly for a lathe comprising:
holder body means having opposite first and second end portions and a central axis, said body means comprising cavity means at said first end portion for defining a generally cylindrical cavity dimensioned to receive a die insert, said body mans comprising bore means for defining a cylindrical mounting bore traversing through said second end portion, and clearance bore means for defining a clearance bore extending between said cavity and said mounting bore and having a diameter less than said cavity diameter and greater than said mounting bore diameter, said mounting bore, said clearance bore and cavity being coaxial with said axis, said body means comprising opening means for defining a pair of aligned radial openings communicating with said clearance bore, said body means exteriorly defining a plurality of flat surfaces equiangularly oriented about said central axis and disposed at said second end portion;
securement means mounted to said holder means for fixedly securing a die insert received ins aid cavity to said holder means;
shaft means slidably received by said mounting bore, said body means being angularly and slidably displaceable thereon; and
a rod slidably removably received in said openings and traversing said clearance bore so as to radially protrude to form a lever arm for rotating said rod about said shaft.

7. The die holder assembly of claim 6 wherein said flat surfaces form a hex head at said second end portion.

8. The die holder assembly of claim 6 wherein said securement means comprises a set screw threaded to said body means.

9. The die holder assembly of claim 8 wherein said securement means comprises a pair of set screws threaded to said body means at diametrically opposed locations thereof.

10. A die holder assembly for a lathe comprising:
holder body means having opposite first and second end portions and a central axis, said body means first end portion having an enlarged diameter comprising cavity means at said first end portion for defining a cavity dimensioned to receive a die insert, said body means comprising bore means for defining a cylindrical mounting bore traversing through said second end portion and comprising opening means for defining a pair of aligned radial openings, said bore and cavity being coaxial with said axis, said body means exteriorly defining a plurality of flat surfaces equiangularly oriented about said central axis at said second end portion;

a die insert received in said cavity;

securement means mounted to said holder means for fixedly securing said die insert to said holder means;

shaft means slidably receivable by said mounting bore, said body means being angularly and slidably displaceable thereon; and a rod slidably removably received in said openings and extending through said body means and said central axis to radially protrude to form a lever arm for rotating said body means about said shaft.

11. The die holder assembly of claim 10 wherein said flat surfaces form a hex head at said second end portion.

12. The die holder assembly of claim 10 wherein said securement means comprises a set screw threaded to said body means and engageable in a cavity of said die insert.

13. The die holder assembly of claim 12 wherein said securement means comprises a pair of set screws threaded to said body means t diametrically opposed locations thereof.

14. The die holder assembly of claim 10 further comprising clearance bore means coaxial with said axis extending between said cavity and said mounting bore and having a diameter less than said cavity diameter and greater than said mounting bore diameter.

15. The die holder assembly of claim 10 wherein said holder body means in an integral sleeve-like member.

16. The die holder assembly of claim 1 wherein said rod comprises a pair of opposed ends and a knob disposed at one of said ends.

17. The die holder assembly of claim 6 wherein said rod comprises a pair of opposed ends and a knob disposed at one of said ends.

18. The die holder assembly of claim 10 wherein said rod comprises a pair of opposed ends and a knob disposed at one of said ends.

* * * * *